(12) United States Patent
Asch (10) Patent No.: US 7,970,263 B1
(45) Date of Patent: Jun. 28, 2011

(54) SEAMLESS INTEGRATION OF VIDEO CAPTURE IN DEMONSTRATION APPLICATIONS

(75) Inventor: Arlyn Asch, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2154 days.

(21) Appl. No.: 10/856,429

(22) Filed: May 28, 2004

(51) Int. Cl.
*H04N 5/783* (2006.01)
*H04N 5/77* (2006.01)
*H04N 5/232* (2006.01)
*H04N 5/775* (2006.01)
*H04N 7/00* (2006.01)
*G06F 3/00* (2006.01)
*G06F 11/30* (2006.01)
*G06F 17/00* (2006.01)
*G06K 7/14* (2006.01)

(52) U.S. Cl. ........ 386/350; 386/224; 386/225; 386/228; 386/230; 235/375; 235/454; 348/211.9; 348/552; 702/186; 715/723; 725/46; 725/61

(58) Field of Classification Search .................... 386/68, 386/46, 69; 235/375, 454; 348/211.9, 552; 348/E5.105; 702/186; 707/E17.009, E17.028; 714/E11.181, E11.193, E11.2, E11.204, E11.212; 715/723; 725/46, 61
See application file for complete search history.

(56) References Cited

U.S. PATENT DOCUMENTS

| 5,696,702 | A  | * | 12/1997 | Skinner et al. ................ 702/186 |
| 6,236,395 | B1 | * | 5/2001 | Sezan et al. ................... 715/723 |
| 6,629,635 | B1 | * | 10/2003 | Akamine ....................... 235/375 |
| 2002/0071651 | A1 | * | 6/2002 | Wurz et al. ....................... 386/46 |
| 2002/0087949 | A1 | * | 7/2002 | Golender et al. ............. 717/124 |
| 2002/0101515 | A1 | * | 8/2002 | Yoshida et al. ............... 348/211 |

OTHER PUBLICATIONS

Techsmith; Snag It: Getting Started Guide; Copyright Date: Nov. 21, 2003; pp. 1-20.*

* cited by examiner

*Primary Examiner* — Thai Tran
*Assistant Examiner* — Syed Y Hasan
(74) *Attorney, Agent, or Firm* — Kilpatrick Townsend & Stockton LLP (57) ABSTRACT

A method is disclosed for recording steps performed in a computer environment to produce an electronic demonstration movie. The method includes recording at least one screen shot corresponding to at least one of the steps using a still motion recorder. The method also monitors the steps for the presence of detail criteria. In response to the detection of detail criteria in the steps, the still motion recorded is paused and a video recorder is initiated for recording full motion video clips of a detailed process. In response to the end of the detail criteria, the video recorder is paused and the still motion recorder is re-instated in response to the pausing of the video recorder. The recorded screen shots and recorded full motion video are then compiled into an electronic demonstration movie.

26 Claims, 10 Drawing Sheets

SEAMLESS INTEGRATION OF VIDEO CAPTURE IN DEMONSTRATION APPLICATIONS

CROSS-REFERENCE TO RELATED APPLICATIONS

The present application is related to concurrently filed, co-pending, and commonly assigned U.S. patent application Ser. No. 10/856,428, entitled "AUTOMATICALLY SCALABLE PRESENTATION OF VIDEO DEMONSTRATION CONTENT," and to co-pending, and commonly assigned U.S. patent application Ser. No. 10/803,290, entitled "METHOD AND SYSTEM FOR AUTOMATICALLY CAPTIONING ACTIONS IN A RECORDED ELECTRONIC DEMONSTRATION," the disclosures of which are hereby incorporated herein by reference.

TECHNICAL FIELD

The present invention relates, in general, to electronic demonstration methods and systems, and more specifically, to the seamless integration of video capture in such systems and methods.

BACKGROUND OF THE INVENTION

Computers and computer technology have greatly increased the efficiency and capability of the individuals who use them. What historically required hours of re-typing and reams of carbon paper 30 years ago, can now typically be accomplished in minutes by a single person operating a word processing application. Spreadsheets, word processors, publishing software, electronic mail, and the like, each add some level of increased capability and simplicity to a user's life. However, with this increased capability a new responsibility has been added to the user: learning how to use this software.

An increase in software training techniques has closely followed the increased use and availability of such productivity software applications. In its simplest form, training is essentially the process of drafting a large user's manual and letting the user read through it to learn the operation of the product. However, a relatively large amount of time may be expended reading through a manual in order to find out specifics on how to operate a given product to perform a specific, desired task. Today, software training, at least in the context of corporations or businesses may be maintained and directed by Information Technology (IT) trainers.

An IT trainer may attempt to train people how to use various software applications, such as email, word processors, and the like, being used at the business. These IT trainers may provide a helpdesk to field calls or questions from employees asking how to perform specific tasks on the software product. Additionally, IT trainers may take a more proactive approach by providing written materials to people explaining and demonstrating the use of the specific product or the steps to take to perform a specific task. One solution for developing such materials would be to write the explanations and steps into a word processing document for distribution to the users. These how-to guides may include screen shots indicating how the product will respond with pop-up windows or dialog boxes along with explanations of what the user should do in response to the pop-up windows, dialog boxes, or the like.

Software applications have been developed to assist IT trainers in creating these instructional materials by recording the demonstrator's or trainer's interaction with the actual software product being demonstrated. Examples of such demonstration development environments include MACROMEDIA INC.'s ROBODEMO™, TECHSMITH CORPORATION'S CAMTASIA™, QARBON, INC.'s VIEWLETBUILDER™, and the like. Demonstration development software allows trainers to record actual simulations of the software to be demonstrated in order to demonstrate that software or how to use a particular feature of that software. The resulting recorded demonstration can then be made available to the users either electronically or on paper. In the electronic media, demonstration applications, such as ROBODEMO™, may record the trainer interaction onto an interactive multimedia movie file that may be played on a user's computer using an interactive multimedia runtime container (iMRC), such as MACROMEDIA INC.'s MACROMEDIA FLASH™ PLAYER.

For example, if an individual does not know how to move a file from one folder to another folder, an IT trainer may record individual screenshots of his actions moving a file from one folder to another folder into a demonstration presentation so that the presentation may then be used to demonstrate to the individual and/or subsequent individuals how to move a file from one folder to another folder. However, if the operations performed by the IT trainer are such that several individual still screen shots of the actions performed by the trainer would be confusing or unclear to the individual, it would be advantageous to record a full motion video clip of those operations.

Systems presently available are limited in their operation as they only either record in full-motion completely or require the use of a separate application to record in full motion. For example, TECHSMITH CORPORATION'S CAMTASIA™ is limited as it only records the full motion of operations performed by an IT trainer, while QARBON, INC.'s VIEWLETBUILDER™ is limited as it requires a separate application to record full motion. While the recording of every step in full motion may clearly capture every single movement, it produces very large files which often pose problems concerning file size limitations. Moreover, the action of having to start a separate application to capture full motion is also inconvenient and ultimately requires additional time for an IT trainer to record operations.

BRIEF SUMMARY OF THE INVENTION

The present invention is directed to a system and method that can record a demonstration using both still shots and active full video shots of various steps performed in a computer environment. The system will monitor the various steps or operations that are being recorded to determine if the activity should be recorded as a still shot or as a full motion video clip. The recording system may determine how the activity to be captured should be recorded by monitoring the activity for the presence of detail criteria. Detail criteria may be any one of a number of various actions that may occur during recording that may be used to signify that the monitored activity should be recorded as a still shot or as a full motion video clip. For example, detail criteria may include a held mouse button, a right mouse button selection, a left mouse button selection, a text entry, the dragging of an object, a keyboard key selection, an indication or detection that some type of visual motion file, such as a video or animation, is present in the active frame, an action or process by the computer that is not user selectable, such as a graphical pop-up initiated by the computer that is activated in response to another action by the computer or the user, and the like. If it is determined from the detail criteria that a still shot will sufficiently capture the monitored activity, then the system will record that activity in some form of still graphics format, such as a bitmap file (BMP), a graphics interchange format (GIF) file, and the like. In contrast, if the detail criteria indicate that the monitored activity is such that it will be better represented by a full motion video clip, then the system is able to pause the still motion recorder, initiate a full motion recorder, and then record the activity in some form of a full motion video format, all from the same application. There is no need to start a different application. Thus, the system operates to seamlessly integrate the operation of a full motion video recorder into the recording system such that the system accomplishes the recording of both still images and full motion video clips from within a single application. The system may also capture the recorded video in some type of video format, such as an audio interleave video file (AVI), a Moving Pictures Experts Group format file (MPEG), and the like. Then, the system may convert the video into a common video format, such as a small web file (SWF) format, which is the native format for MACROMEDIA FLASH™, HQX, which is the native format for APPLE COMPUTER CORP'S MACINTOSH™ PROJECTOR™, and the like.

After recording of the activity is completed, the system may then compile the still shots and full motion video into a single format, such as SWF, so that replay may be implemented within a simple framework, such as an interactive multimedia runtime container (iMRC) like the MACROMEDIA FLASH™ player. The final electronic demonstration movie may then be easily edited by an IT trainer by using an interactive multimedia application environment (iMAE), such as MACROMEDIA'S MACROMEDIA FLASH™.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
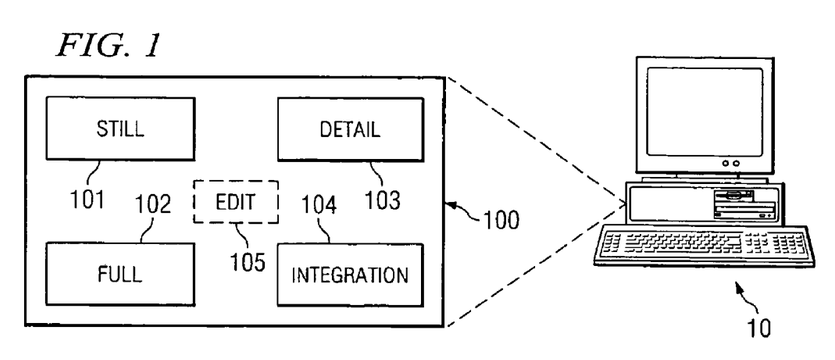
FIG. 1 is an illustration of a general architecture of a system of the present invention.

FIG. 1 is a diagram illustrating demonstration development environment 100 implemented on computer 10 for creating electronic demonstration movies or presentations according to one embodiment of the present invention. The electronic demonstration movie may be created by recording screen shots of a series of demonstrated steps or operations performed within computer 10.

Demonstration development environment 100 represents one application running on computer 10. In one embodiment, demonstration development environment 100 includes still motion recording module 101, full motion recording module 102, detail criteria detection module 103, and an integration module 104. Demonstration development environment 100 is advantageous because both still shots and full motion video clips of the demonstrated steps may be recorded within one single application, demonstration development environment 100, without the need for a different application to facilitate the recording of full motion video.

Still motion recording module 101 records still screen shots of various steps or tasks that are the subject of the demonstration or part thereof. Full motion recording module 102 records the full motion video of steps or tasks that are the subject of or part of the demonstration movie. Complex steps or operations that may be better demonstrated in video will be captured as a full motion video clip by full motion recording module 102. For example, if an IT trainer wanted to create a demonstration movie of how to perform a drag and drop procedure, the operation of selecting the file to be moved can be captured with a still shot by still motion recording module 101 while the operations involved in moving the selected file with the mouse from one location to another may benefit from being captured in full motion by full motion recording module 102. If the drag and drop action were instead, represented by a series of still shots, it may not convey the exact nature of the task to a user as well as it could using a complete video illustrating the click and hold of the mouse on the selected file, the dragging of the selected file from one folder to another folder, and the dropping of the file at its destination.

Detail criteria detection module 103 monitors and analyzes the various steps or operations being recorded to determine if the steps or operations include detail criteria indicating that they should be captured with still motion recording module 101 or full motion recording module 102. For example, detail criteria detection module 103 may include logic that will analyze the type of operation or action being performed for a specific set of predetermined detail criteria. If the type of action is one that would normally benefit from full motion video based on these detail criteria, then full motion recording module 102 may be automatically activated so that the action can be captured in full motion. In some embodiments, detail criteria detection module 103 may be arranged in such a manner that an IT trainer may manually or selectively activate full motion recording module 102 to capture the actions in full motion. For example, the manual action may comprise some type of toggle, such as a button, switch, computer key, or click by a mouse, to activate full motion recording module 102. The present invention may also be arranged in some embodiments so that an IT trainer may have the option to opt-in or opt-out of the operation of a trigger. For example, an IT trainer may choose to opt-out of the trigger operation so that the IT trainer never has to use a trigger to use full motion recording module 102 or the IT trainer may choose to opt-in in favor of the trigger so that the IT trainer may use a trigger to activate full motion recording module 102 or so that the recording module 102 will only operate upon activation of a trigger by the IT trainer.

Integration module 104 operates to seamlessly integrate full motion recording module 102 into demonstration development environment 100 so that full motion video clips can be captured without the need to start a separate application. For example, while an IT trainer demonstrates some function that includes a plurality of steps in a computer environment, demonstration development environment 100 is evaluating the steps through detail criteria detection module 103. As the steps are evaluated, each step is being captured by either still motion recording module 101 or by full motion recording module 102 depending on the operations of detail criteria detection module 103. Thus, if detail criteria detection module 103 determines that a step should be captured in full motion, integration module 104 seamlessly integrates full motion recording module 102 into the operation of the demonstration development environment 100 to record the step identified as one that should be captured in full motion. As such, the capture of full motion video is seamlessly integrated with the capturing of still motion shots within the same demonstration environment. After recording the entire demonstration, demonstration development environment 100 may assemble/compile the full motion video clips and still images so that they are presented as a single electronic demonstration movie or presentation. The completed electronic demonstration presentation is such that the full motion clips are indistinguishable from the still motion shots.

The electronic demonstration movie comprises a plurality of frames contained within a sample movie-format file. The IT trainer may edit the individual frames of the demonstration movie before the final demonstration presentation is ready for viewing. For example, when the electronic demonstration movie is in the MACROMEDIA FLASH™ environment, the frames may be presented to the IT trainer in the MACROMEDIA FLASH™ VIDEO (FLV) format within the MACROMEDIA FLASH™ development environment. The IT trainer may then edit the FLV formatted movie before it is compiled into a small web file (SWF) to be played on the MACROMEDIA FLASH™ player. Thus, demonstration development environment 100 may also comprise edit module 105 allowing for the capability to edit the still motion files, full motion files, and the assembled movie file. Demonstration development environment 100 may then compile the plurality of frames into a completed movie file, such as a SWF or the like. For example, after a series of steps are recorded as a combination of several still shots and full motion video clips, demonstration development environment 100 will compile the various frames into a completed electronic demonstration movie or presentation.

The program or code segments making up demonstration development environment 100 can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 2:
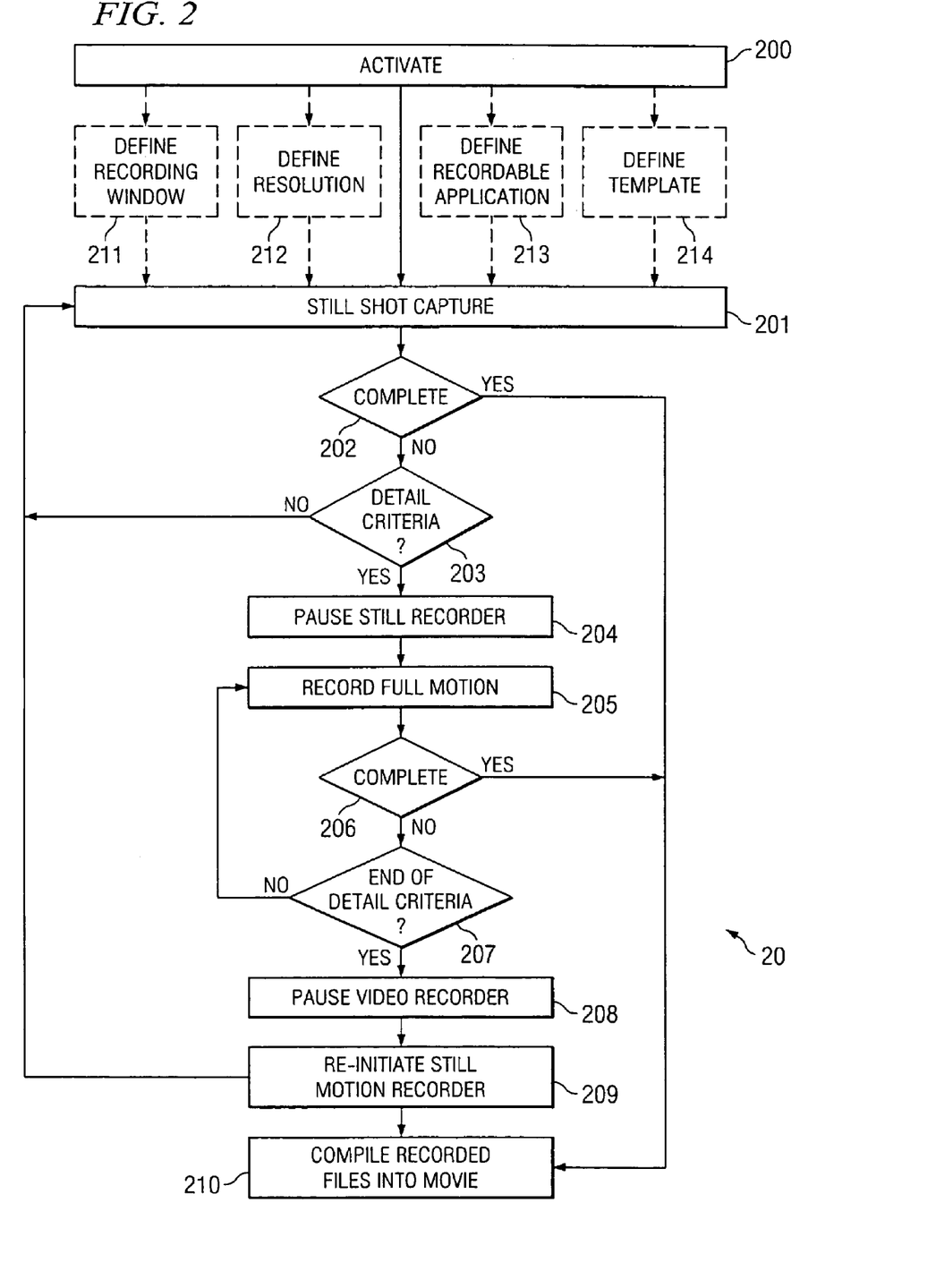
FIG. 2 is a flowchart illustrating example steps for producing an electronic demonstration movie according to one embodiment of the present invention.

FIG. 2 is a flowchart illustrating steps implemented in producing an electronic demonstration movie according to an embodiment of the present invention. Flow 20 illustrates a method for recording various steps performed in a computer environment in order to create an electronic movie. The movie may be a demonstration movie used by IT professionals to help with various training needs. Demonstration development environment 100 is activated in block 200. In block 201, a screen shot is recorded by a still motion recorder. A screen shot, also known as a screen capture, is a copy of the content currently being displayed on the computer screen that will be saved to some type of still graphics file. The screen shot may be of any one of a number of steps performed by an individual, such as an IT professional, in a computer environment. For example, a screen shot may be a still picture of a step performed by an IT trainer in selecting a particular button or file on the computer display. The still motion recorder may be any type of recorder or application capable of capturing or creating the screen shot. The graphics file created by the still motion recorder may comprise any one of a number of various still graphic formats, such as a bitmap file (BMP), a graphics interchange format (GIF) file, a graphic file created using a Joint Photographic Experts Group standard (JPEG), a tagged image file format (TIFF), portable networks graphics file (PNG), and the like.

Following block 201, flow 20 advances to block 202. In block 202, a query is run to determine if the steps to be recorded are complete. If the steps to be recorded are completed, then the recording will stop and flow 20 will advance to block 210. If the steps to be recorded are not complete, then flow 20 will proceed to block 203. In block 203, another query is performed to check for the presence of detail criteria to determine if full motion recording is needed. If the query for detail criteria for the need to activate full motion recording is negative, then flow 20 proceeds to block 201. If the query is positive, indicating that the step may benefit from more detail demonstration, then flow 20 proceeds to block 204. In block 204, the still motion recorder is paused. After the still motion recorder is paused, flow 20 proceeds to block 205. In block 205, a video recorder is initiated and operates to record the full motion of a detailed process. The detailed process may comprise one step or it may comprise a series of steps. The video recorder is any type of recorder or application capable of recording or creating a full motion graphics file. The graphics file created by the video recorder may comprise any one of a number of various full motion graphic file formats, such as an audio interleave video file (AVI), a windows media video file (WMV), an advanced streaming format file (ASF), a flash video format file (FLV), a Moving Pictures Experts Group format file (MPEG), and the like.

Detail criteria or criterion may be one or a plurality of standards or principles for testing or evaluating the various steps performed in a computer environment. For example, in one embodiment, detail criteria may be a list of factors stored in a memory array or database so that when the system monitors an activity, the system will check that activity against the list of detail criteria. If the activity indicates the presence of one of the factors stored in the list, then full motion recording module 102 may be activated. According to one embodiment, the detail criteria is used to determine if a step or series of steps performed can be adequately represented by a still graphics file or whether the step or series of steps needs to be captured by a full motion graphics file. For example, the system may monitor the actions of a mouse or keyboard. Thus, when an IT trainer is performing an operation that is being recorded and the operation begins with the left or right mouse button depressed for some period of time, full motion recording may be activated based on the actions of the mouse, which would be a detail criteria that triggers full motion recording. Other detail criteria that may trigger full motion recording may include the presence and operation of some type of visual motion file, such as a video or animation, in the active frame, the occurrence of a non-user selectable action that is initiated by the computer in response to another action by the computer or the user, the selection of a particular key on the keyboard, holding a mouse button depressed for some period of time, depressing both mouse buttons, clicking of the right mouse button, clicking of the left mouse button, and the like. Therefore, any activity subsequent to the start of the full motion recorder occurring while the full motion recorder is activated will be recorded in full motion.

The detection of detail criteria may be implemented automatically or manually. In such embodiments where the detection of detail criteria is implemented automatically, the detection of detail criteria may comprise some form of logic operating as software that will continuously monitor the steps performed by an individual to determine if the step or steps shall be recorded in full motion. If the logic determines that the steps shall be recorded in full motion, the logic will trigger flow 200 to proceed to block 204 as discussed above. In embodiments where the detection of detail criteria is implemented manually, the detail criteria may comprise some sort of operation that must be manually activated in order for flow 200 to proceed to block 204. For example, the operation may comprise any one of a number of various operations such as clicking a computer mouse, pressing/depressing a keyboard key, a voice activated toggle, and the like.

In an alternative embodiment, the recording system may operate to continuously capture a set number of frames in full motion video and store this range of frames in memory so that when the system detects the presence of detail criteria signaling the need to record activity in full motion, the recording system could essentially go back in time and record all previously captured frames that are still present in memory plus all frames going forward until the detail criteria or the IT trainer deactivates the need to record in full motion. In such an embodiment, the window of frames that are continuously captured in full motion and placed in memory may operate on a first-in first-out basis comprising any number of frames. For example, the recording system may operate so that fifty frames of activity captured in full motion are continuously present in memory, and as a new frame is captured and placed into memory (last frame captured), the first frame that was captured and placed in memory will be the first frame dumped from the memory. Thus, when the recording system holds fifty frames in memory, as the fifty-first frame is captured and placed into memory, the first frame captured and placed into memory will be the first frame dumped out of memory.

After block 205, flow 20 proceeds to block 206 where a query is performed to check if the steps to be recorded are complete. If the steps to be recorded are complete, then flow 20 advances to block 210. If the steps to be recorded are not complete, then flow 20 advances to block 207. In block 207, another query is done to check the detail criteria to determine if the need to record activity in full motion is finished. If the need to record in full motion has not ended, then flow 20 continues recording full motion in block 205. If an end to the need to record full motion is detected, then flow 20 proceeds to block 208. In block 208, the video recorder is paused. After the video recorder is paused, flow 20 proceeds to block 209. In block 209, the still motion recorder is re-initiated. After block 209, flow 20 returns to block 201.

Although checks to determine if the steps to be recorded are complete are illustrated in flow 20 in blocks 202 and 206, the present invention is not limited to this arrangement, as checks to determine when the steps to be recorded are complete may be arranged at any stage of flow 20. When the steps to be recorded are complete, then flow 20 will advance to block 210 as indicated above. In block 210, the recorded screen shot(s) and the recorded full motion video(s) may be compiled or assembled into an electronic demonstration movie. If the steps recorded were such that there is no full motion video, then the demonstration development environment will generate a movie from the still shots, and similarly, if the steps recorded include full motion video clips and still motion images, then these two formats will be assembled into a single movie. The electronic demonstration movie may be generated into any one of a number of various file formats, such as a MACROMEDIA FLASH™ file format (SWF), a MACINTOSH PROJECTOR™ file format (HQX), an executable movie file format (EXE), a hypertext markup language movie file format (HTML), and the like.

In an alternative embodiment, flow 20 may also include block 211. In block 211, a recording window is defined. A recording window defines the area in which recording will occur. For example, if an IT trainer preferred to only record events or steps taking place in the middle of the screen, then a recording window could be defined as the middle of the screen. Flow 20 could also include block 212. In block 212, an IT trainer would define the resolution at which the still motion and full motion recorder will record. For instance, the resolution could be set at a very high value to create a very clear electronic demonstration movie or the resolution can be set at a minimal level where movie resolution is not important.

In yet another embodiment, flow 20 may include block 213. In block 213, a recordable application would be defined. After the recordable application is defined, all recording performed in flow 20 (including both still motion and full motion recording) would be limited to steps performed within the defined recordable application. For example, if an IT trainer were interested in teaching individuals how to perform various tasks within MICROSOFT CORPORATION'S INTERNET EXPLORER™, then the IT trainer could define the recordable application as INTERNET EXPLORER™. After defining INTERNET EXPLORER™ as the recordable application, then only steps performed within INTERNET EXPLORER™ would be recorded.

Flow 20 may also comprise block 214 in an alternative embodiment. In block 214, an IT trainer can define templates to store various recording options, such as recording speed, recording resolution, recording window, and the like. For example, an IT trainer who will be working on a training movie can define a template storing specific settings related to any number of attributes the first time the IT trainer begins to create the movie. Then, the next time the IT trainer resumes work on the same movie or begins to work on a new movie, the previously defined template can be selected in order to avoid having to define settings every time the IT trainer begins to work on a movie. It should be noted that various embodiments of the present invention may include any one or a combination of the various options described and shown in blocks 211-214.

FIGS. 3A-3F are screenshots illustrating various modes of operation of the recording system configured according to an embodiment of the present invention. The various modes of operation illustrated in FIGS. 3A-3F are implemented in MACROMEDIA, INC's ROBODEMO™ demonstration application development environment. It should be noted that the present invention is not limited in its application to the embodiment illustrated by ROBODEMO™.

Figure 3A:
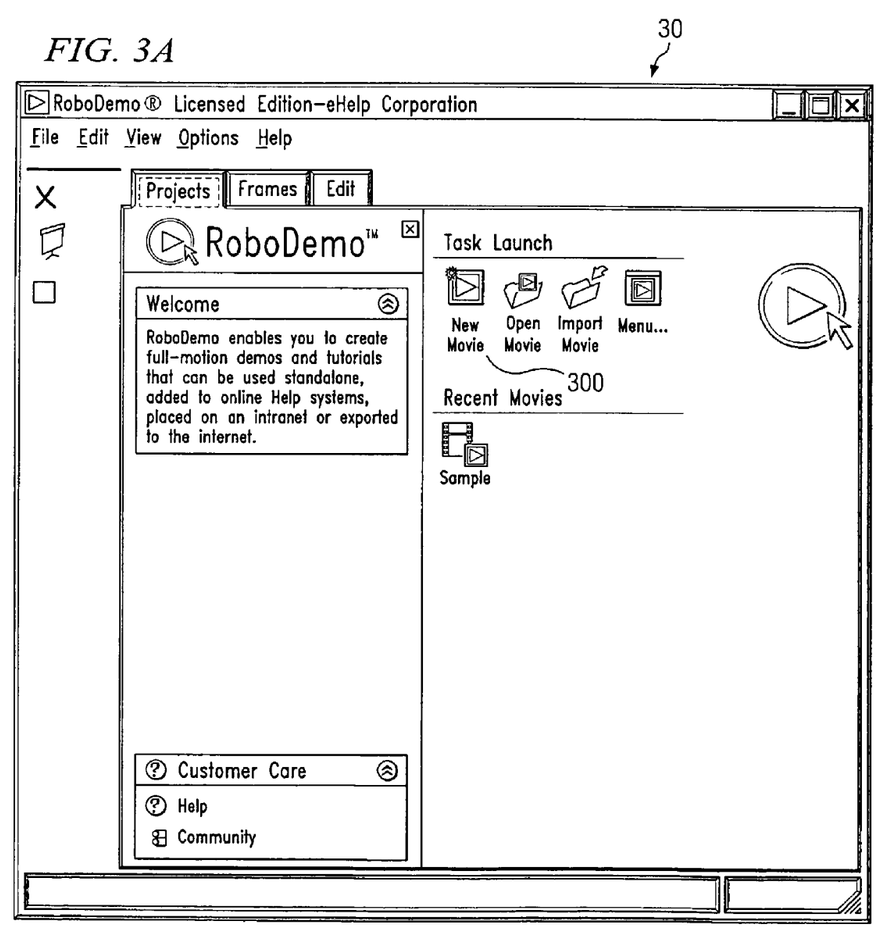
FIGS. 3A-3F are screenshots illustrating various modes of operation of a recording system according to one embodiment of the present invention.
Figure 3B:
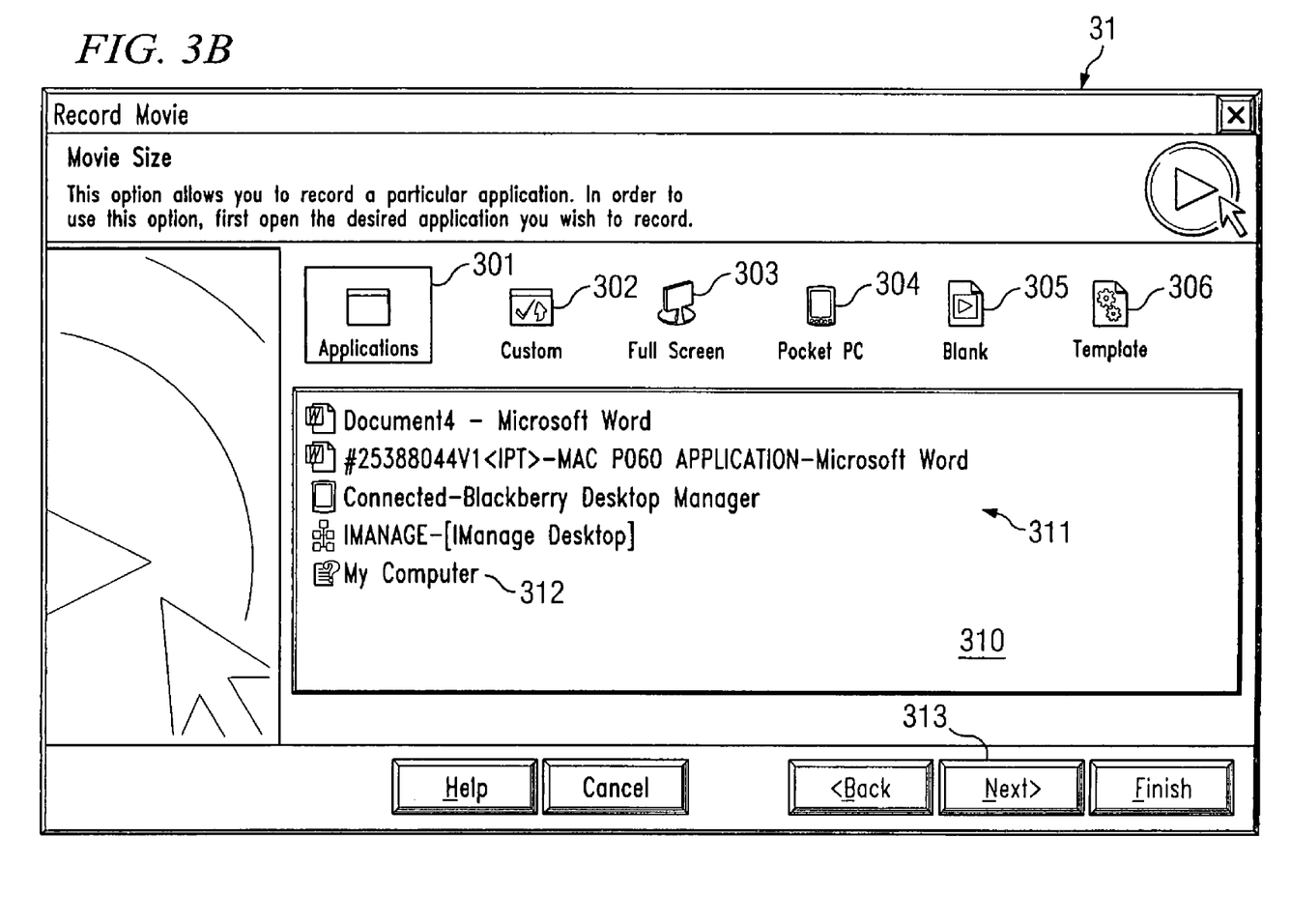

Window 30, of FIG. 3A, illustrates the initial step in creating an electronic demonstration movie. As illustrated, an IT trainer selects new movie icon 300 to create a new demonstration movie. In response to selection of new movie icon 300, the recording system presents the IT trainer with movie size window 31, as illustrated in FIG. 3B, wherein the recording system allows the IT trainer to configure various aspects related to the size of the movie. Various options available to the IT trainer include application option 301, custom option 302, full screen option 303, pocket PC option 304, blank option 305, and template option 306.

When application option 301 is chosen, the recording system allows an IT trainer to select a particular application to record. In order for the IT trainer to record the application, the IT trainer opens the desired application that the IT trainer wishes to record. Selection area 310 illustrates list 311 which presents the various applications running that the IT trainer may choose to record. For example, if an IT trainer wishes to record the operations performed during a drag and drop procedure, the IT trainer may select My Computer application 312. After selecting application 312, the IT trainer may select "Next" button 313, after which the system will advance to the next screen.

Figure 3C:
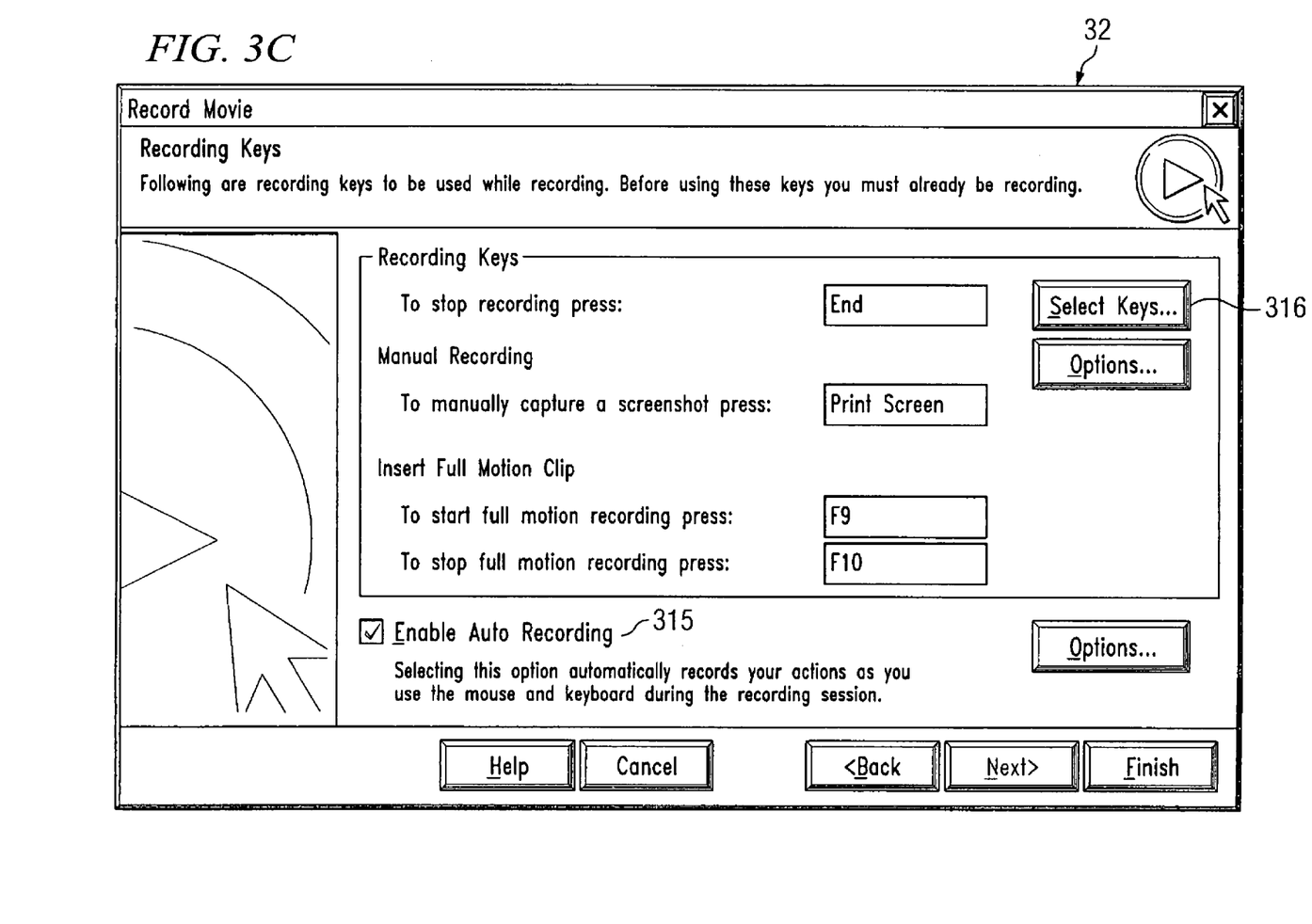

After selecting "Next" button 313, recording keys window 32, illustrated in FIG. 3C, is presented to the IT trainer. The recording keys window 32 presents the keys to be used while recording. In the embodiment shown in FIG. 3C of MACROMEDIA, INC's ROBODEMO™ demonstration application development environment, the "End" key is used to stop recording, the "Print Screen" key is used to manually capture a screen shot, the "F9" key is used to manually start full motion recording, and the "F10" key is used to manually stop the full motion recording. The system also presents the IT trainer with the ability to select auto recording option 315 which will enable automatic recording. By selecting option 315, the recording system operates so that actions will be automatically recorded as the IT trainer uses the mouse and keyboard during a recording session.

Other implementations may use different key configurations to start and stop recording and may also allow an IT trainer to customize the recording keys. For example, an IT trainer may configure recording options by selecting the "Select Keys" button 316. When an IT trainer depresses button 316, the system may advance the IT trainer to the recording options window 33 shown in FIG. 3D. The system allows the IT trainer to change the recording control keys, select the options used while recording the movie, and select the specific options used while recording full motion clips. The system allows the IT trainer to change the recording control keys by selecting Change Recording Keys tab 317, to change options used while recording full motion clips by selecting Full Motion Recording tab 318, and to change recording options by selecting Recording Options tab 319.

When the IT trainer selects the Change Recording Keys tab 317, the system allows the IT trainer to change the recording control keys that are originally presented as default keys (End, Print Screen, F9, F10) in the recording keys window 32 of FIG. 3C.

Figure 3D:
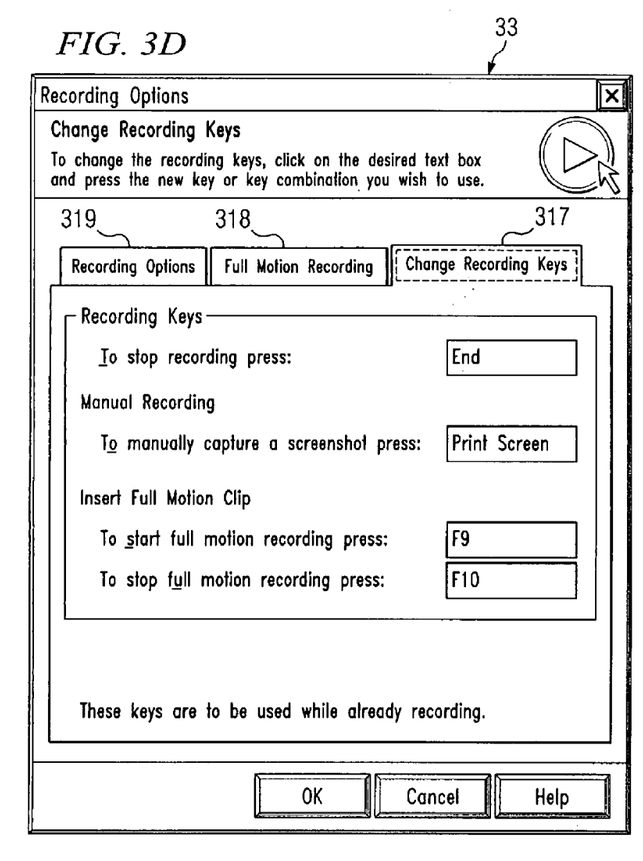
Figure 3E:
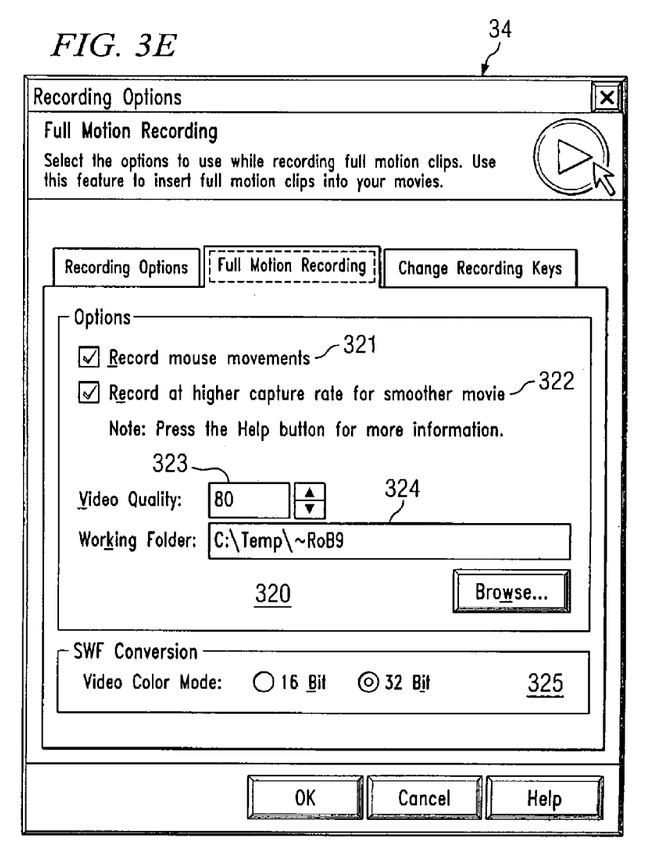

When the Full Motion Recording tab 318 is selected, the system presents the IT trainer with full motion recording window 34 illustrated in FIG. 3E. This option allows the IT trainer to select the options to use while recording full motion clips. An IT trainer is able to select various options under options area 320 and choose the video color mode under SWF conversion area 325. The system may also present the IT trainer with the record mouse movements option 321 which will enable the system to include mouse movements during full motion recording.

The demonstration system may also allow an IT trainer to change the capture rate with capture rate option 322. When the capture rate option 322 is selected, the system will disable hardware acceleration to create a smoother movie. When hardware acceleration is on, it uses a great deal of system resources and hinders full motion recording. Thus, by turning hardware acceleration off, the system operates so that the full motion recording will have better quality. The system may also allow the IT trainer to change the video quality with video quality option 323. When video quality option 323 is selected, the system allows the IT trainer to configure the quality level for the video. A high quality, such as 80-100 results in a smooth, attractive video, but the video will be large in size. By selecting a lower quality, the system will produce a video that may appear blocky, but the video will have a smaller file size. The system may also allow the IT trainer to choose where to save full motion video files on the local hard drive with working folder option 324. Working folder option 324 will allow the IT trainer to type in a path to an exact location or choose to browse in order to locate a specific location. In addition, the system may allow the IT trainer to change the video color with SWF conversion area 325. SWF conversion area 325 allows the IT trainer to set the video color to 16 bit or 32 bit. Selecting 16 bit results in a smaller file size with a smaller range of colors and selecting 32 bit creates a larger file with a wider range of colors.

Figure 3F:
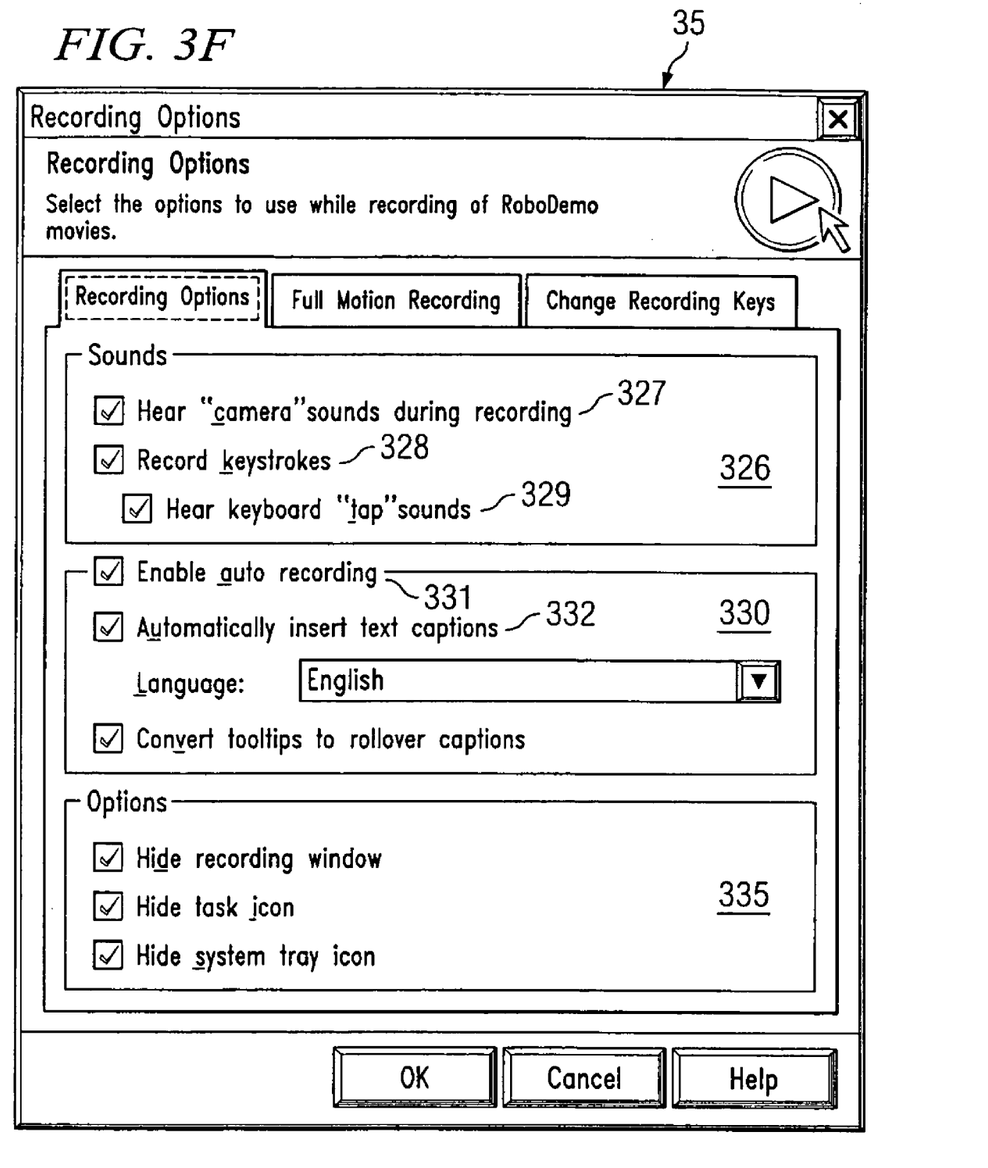

Another option presented to the IT trainer in recording options window 33 of FIG. 3D is the Recording Options tab 319. When Recording Options tab 319 is selected, the system will present the IT trainer with recording options window 35 which is illustrated in FIG. 3F. The recording options allow the IT trainer to change options used in recording both the still motion and full motion components of the electronic demonstration movie. When Recording Options tab 319 is selected, the system may allow the IT trainer to select options associated with sound as shown by sounds selections area 326, select options associated with auto recording as shown by auto recording selections area 330, and select other options represented by options selections area 335. When sounds selections area 326 is selected, the system allows the IT trainer to enable camera sounds by checking camera sounds option 327. When camera sounds option 327 is enabled, the system will produce camera sounds which will be heard during recording. For example, a camera shutter sound may play whenever a screen shot is taken during recording. The system may also allow the IT trainer to select record keystrokes option 328 in order to enable the recording of keystrokes. When enabled, the system may record keystroke action during recording of the movie. For example, keyboard input may be recorded and the keystrokes may appear in the finished movie, but a screen shot for every character may not be taken. The system may also record keyboard tap sounds during the recording by allowing the IT trainer to select hear keyboard tap sounds option 329. Although the keyboard tap sounds may be recorded, the recording system may not include the keyboard tap sounds in the finished movie. When the recording system is configured so that sound will be captured during recording, the various sounds will be added and synchronized with the captured video clips or captured still motion shots.

In an alternative embodiment, the recording system may automatically record various operations performed during the recording of the movie. The recording system may be configured so that auto-recording is always present or the IT trainer may be able to turn auto-recording on and off. When the recording system allows the IT trainer to select this option, the recording system may present the IT trainer with the ability to do so with auto recording selections area 330 which allows the IT trainer to select enable auto recording option 331. When selected, the recording system will operate so that screen shots are automatically captured during the recording process each time the IT trainer clicks the mouse, changes the focus of the application or web page, or presses a key on the keyboard. The recording system may also operate so that various actions automatically generate screen shots, such as clicking a capture key, opening a menu, opening a dialog box, clicking a toolbar button, clicking buttons, and the like. The system may also automatically insert text captions which may also be enabled and disabled by the IT trainer. The IT trainer can enable this option by selecting automatically insert text captions option 332.

The recording system may also allow an IT trainer to customize recording by selecting various recording options. As discussed above with reference to FIG. 3B, the IT trainer may customize the size and portion of the recording window by selecting Custom selection option 302. The IT trainer may also choose to record all activity on a screen by selecting Full Screen option 303. Full screen recording will record all selected onscreen action. In addition, an IT trainer may also choose Pocket PC option 304. When Pocket PC option 304 is selected, the recording system records selected action to be displayed on pocket PC devices. The IT trainer may also choose Blank Screen recording option 305. When blank screen recording is chosen, the recording system will record a blank frame in a size specified by the IT trainer. The blank screen recording option is helpful in many instances. For example, blank screen recording may be helpful if the IT trainer wanted to create an empty project and then import files from various other applications, such as MICROSOFT POWER POINT™ slides, frames from another movie, presentations created from COREL CORPORATION'S PRE-SENTATIONS™, still images from other applications, and the like.

In one embodiment, the recording system may allow an IT trainer to record activities and steps based on templates. An IT trainer may operate the recording system with a template by selecting Template option 306, also shown in FIG. 3B. When Template option 306 is chosen, the recording system allows the IT trainer to select a pre-recorded project template. Template option 306 helps the IT trainer save time and maintain consistency in creating electronic demonstration movies.

Figure 4A:
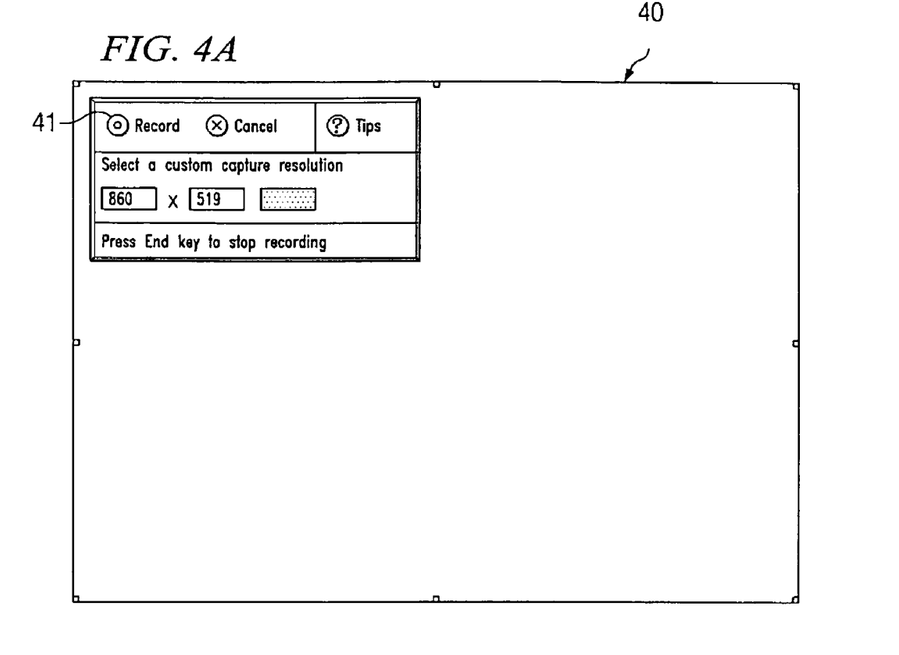
FIGS. 4A-4D are screenshots illustrating an example operation of a recording system, according to one embodiment of the present invention.

FIGS. 4A-4D illustrate screenshots of an example operation performed by the recording system according to one embodiment of the present invention. The operations depicted are steps performed during a standard drag and drop operation whereby the recorded steps are then incorporated into an electronic demonstration movie after the IT trainer has configured the recording system as described in FIGS. 3A-3F. Once the IT trainer has finished configuring the recording options described above, the recording system is ready to record. As illustrated in FIG. 4A, the recording system will present recording window 40 to the IT trainer. Window 40 may be resized according to the IT trainer's preference. For example, if the IT trainer has chosen Custom movie size option 302 and then realizes that recording window 40 is too small or too big, the IT trainer may adjust the size of window 40.

Figure 4B:
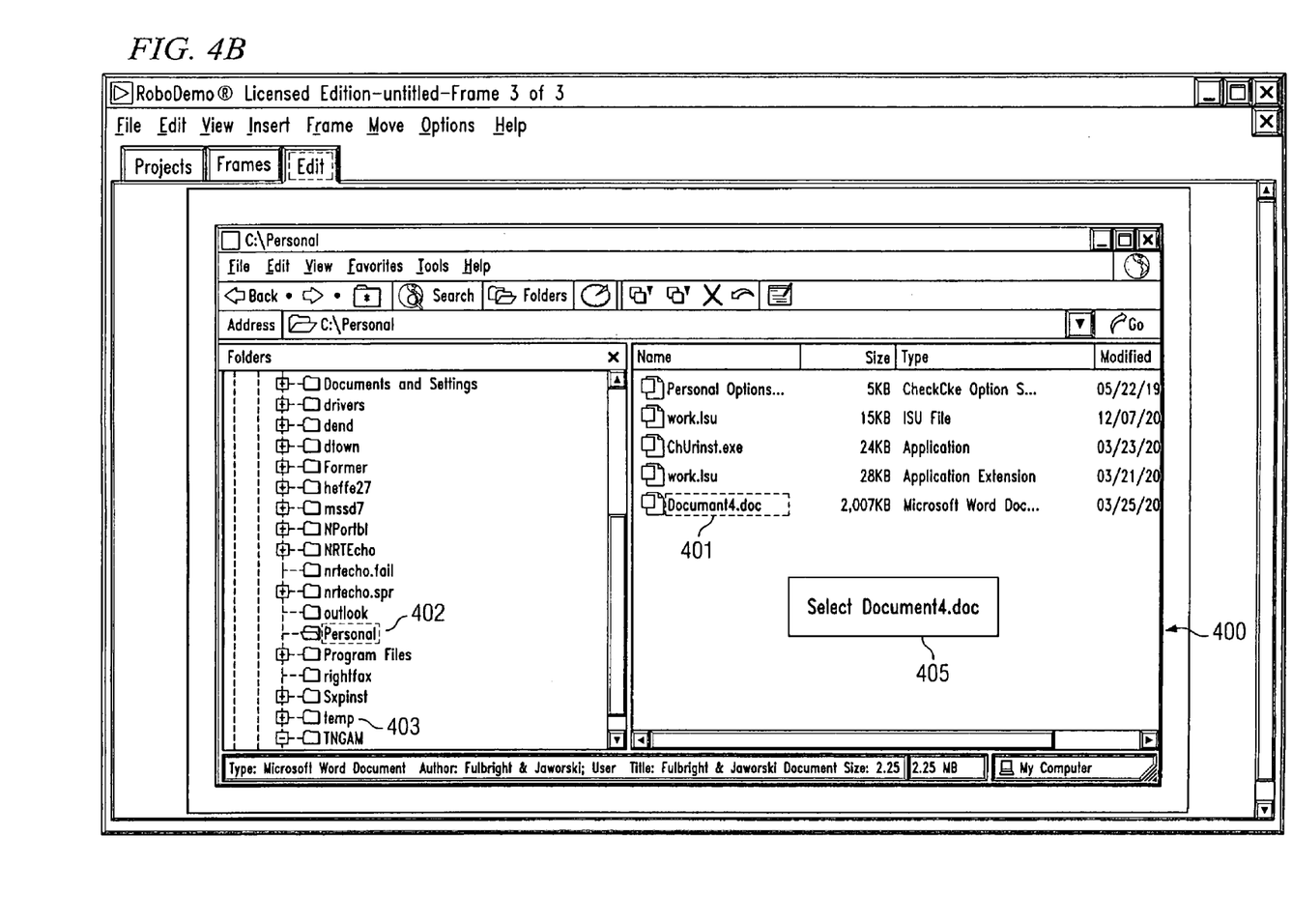
Figure 4C:
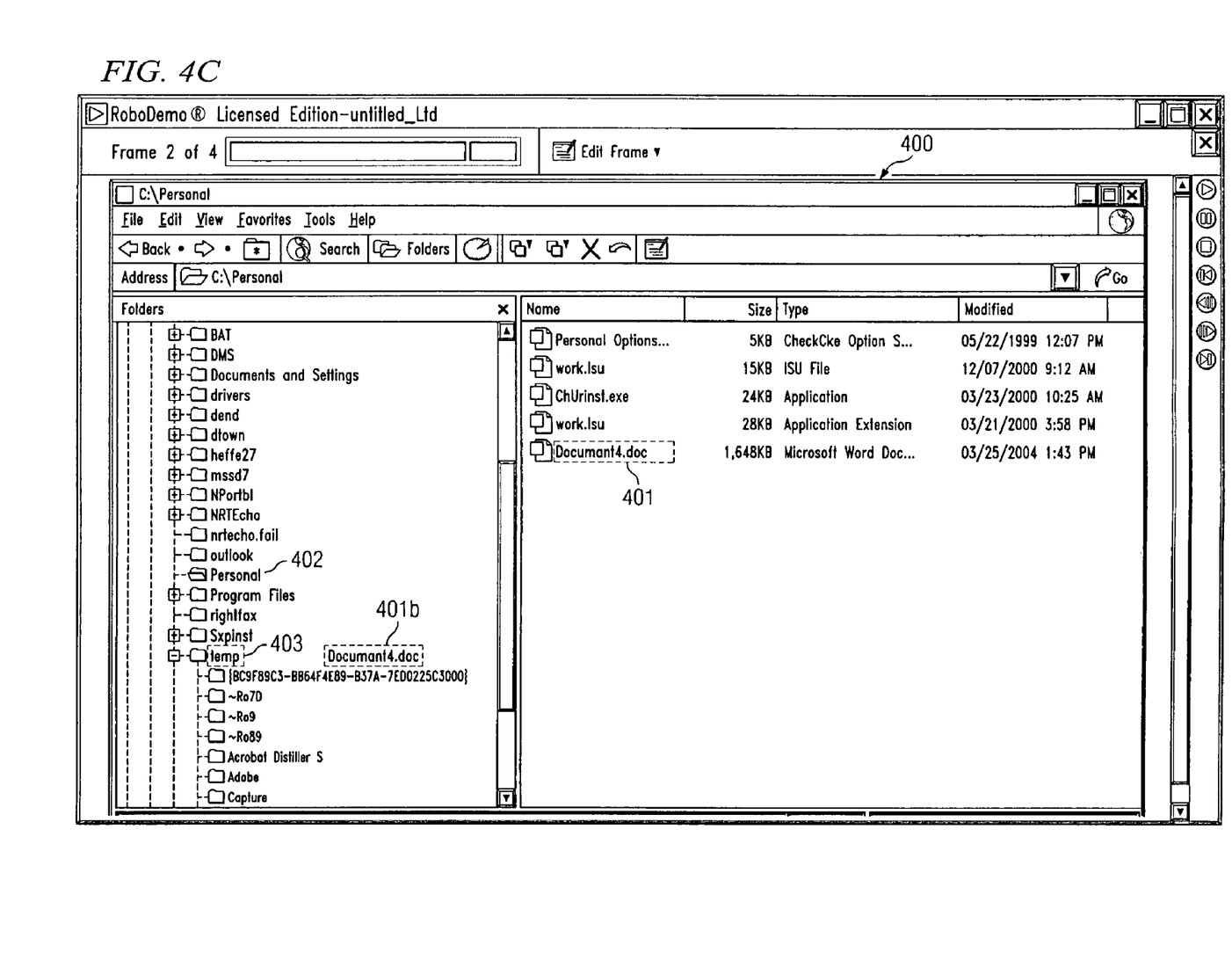

The recording system will begin to record actions performed within recording window 40 upon detecting the activation of record button 41. FIGS. 4B and 4C illustrate two different views of window 400. The two illustrations of window 400 illustrate the on-screen actions that occurred within recording window 40 and that were recorded during the operation of conducting a simple drag and drop procedure from Windows Explorer. In this drag and drop procedure, document file 401 is transferred from "Personal" folder 402 to "temp" folder 403. FIG. 4B illustrates a still shot recorded by the recording system where the recording system also generated text caption 405 describing the operation of selecting document file 401. One system and method for automatically captioning actions in a demonstration environments is described in co-pending commonly-assigned application Ser. No. 10/803,290 entitled "METHOD AND SYSTEM FOR AUTOMATICALLY CAPTIONING ACTIONS IN A RECORDED ELECTRONIC DEMONSTRATION."

Figure 4D:
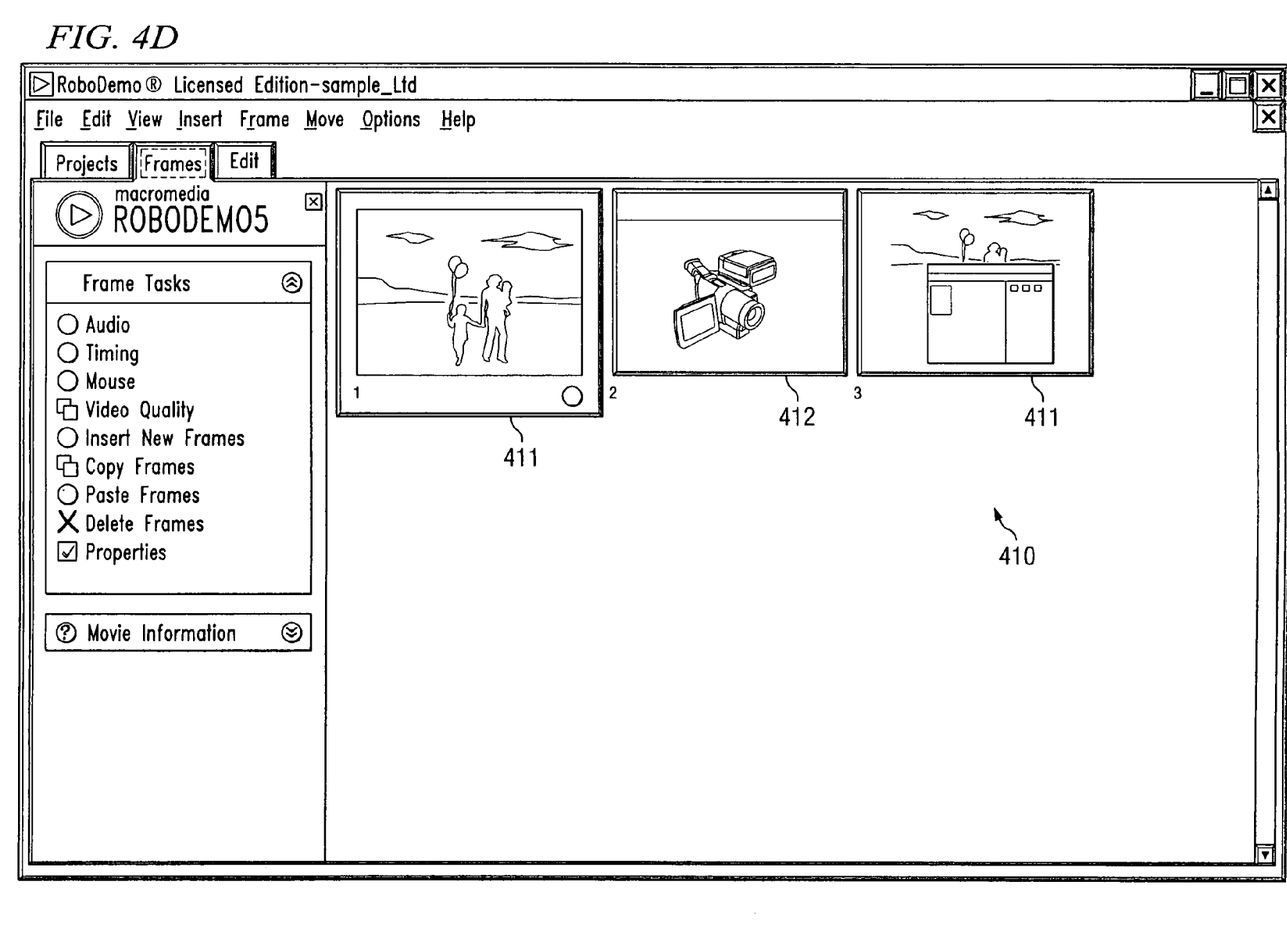

FIG. 4C illustrates a part of the full motion video clip that may be recorded while file 401 is in the process of being dragged, as indicated by drag image 401*b*, which indicates that document file 401 is being dragged from "Personal" folder 402 to "temp" folder 403. After the recording system has finished recording, the system presents both the still shots and any full motion clips as a plurality of frames 410 as shown in FIG. 4D. In an alternative embodiment, the recording system may use one kind of icon to indicate which frame(s) represents a still shot and a different icon to indicate which frame(s) represents a full motion video clip. For example, in FIG. 4D, the still shot frames 411 are indicated in a first manner as an image of the still shot and full motion video clip 412 is indicated in a second manner as an icon of a video recorder.

By presenting the recorded activity as a plurality of frames, the IT trainer is given a chance to quickly view the recorded steps frame by frame. In alternative embodiments, the recording system will present the IT trainer with a chance to edit each individual frame. In one embodiment, the IT trainer may edit the frames in some type of interactive multimedia application environment (iMAE) such as MACROMEDIA'S MACROMEDIA FLASH™ and the like. If the IT trainer is satisfied and does not edit any of the frames, the recording system can use the recorded material to create the electronic demonstration movie. In creating the electronic demonstration movie, the system will compile/assemble the still motion shots and the full motion video clips into an electronic demonstration movie. The movie is created so that when the demonstration movie is played, it appears as one continuous stream of frames with no indication as to which part of the movie is still shots and which part is comprised of full motion video clips.

Figure 5:
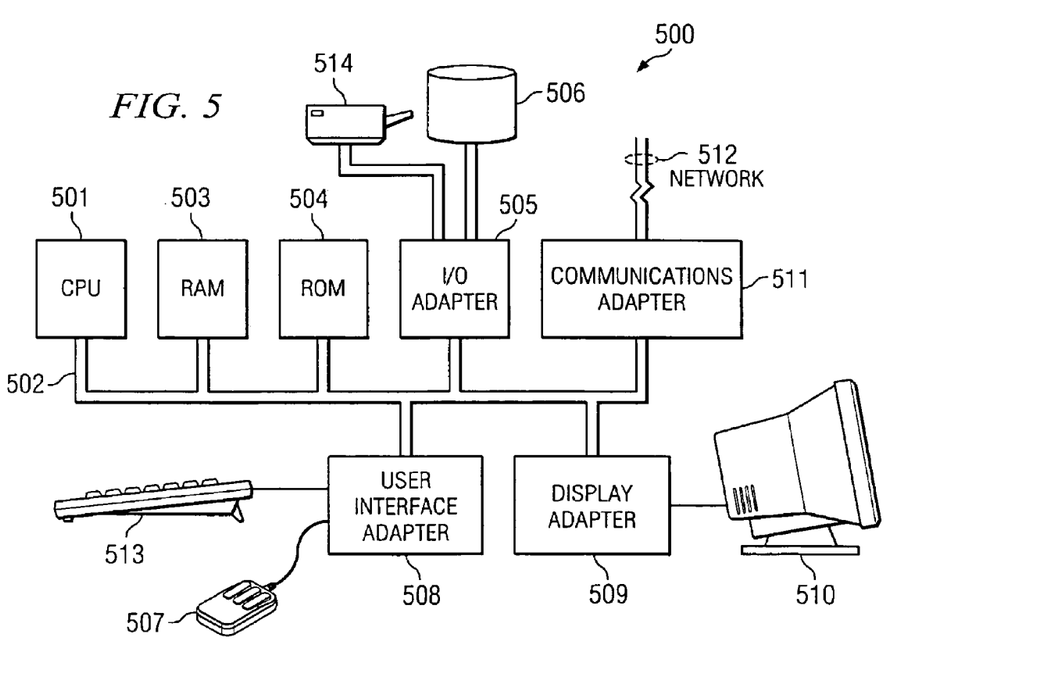
FIG. 5 depicts a block diagram of a computer system which is adapted to use an embodiment of the present invention.

FIG. 5 illustrates computer system 500 adapted to use embodiments of the present invention, e.g. storing and/or executing software associated with the embodiments. Central processing unit (CPU) 501 is coupled to system bus 502. The CPU 501 may be any general purpose CPU. However, embodiments of the present invention are not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects storage devices 506, such as one or more of a hard drive, a CD drive, a floppy disk drive, a tape drive, to computer system 500. The I/O adapter 505 is also connected to printer 514, which would allow the system to print paper copies of information such as documents, photographs, articles, etcetera. Note that the printer may be a printer (e.g. dot matrix, laser, etcetera.), a fax machine, scanner, or a copier machine. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507, etcetera to the computer system 500. The display card 509 is driven by CPU 501 to control the display on display device 510.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for recording steps performed in a computer environment to produce an electronic demonstration movie, said method comprising:
    recording at least one screen shot corresponding to at least one of said steps using a still motion recorder;
    monitoring the steps performed in the computer environment, wherein said monitoring comprises executing logic to automatically examine said steps for detail criteria, wherein said detail criteria comprises activity occurring over time to be captured in said steps;
    responsive to discovering said detail criteria in said at least one of said steps:
        pausing said still motion recorder; and
        initiating a video recorder to record full motion of a detailed process comprised of a plurality of said steps; and
    responsive to an end to said detail criteria:
        pausing said video recorder; and
        re-instating said still motion recorder in response to said pausing.

2. The method of claim 1 further comprising:
    compiling said at least one screen shot and said recorded full motion into an electronic demonstration movie.

3. The method of claim 1 wherein said detail criteria includes demonstrator-selection.

4. The method of claim 1 wherein said detail criteria comprises a dragging of an object.

5. The method of claim 1 wherein said still motion recorder records in at least one of:
    a bitmap format (BMP);
    a graphics interchange format (GIF);
    a Joint Photographic Experts Group format (JPEG);
    a tagged image file format (TIF) and
    a portable networks graphic format (PNG).

6. The method of claim 1 wherein said video recorder records in at least one of:
    an audio interleave video file (AVI);
    a windows media video file (WMV);
    an advanced streaming format file (ASF);
    a flash video format file (FLV); and
    a Moving Pictures Experts Group format file (MPEG).

7. The method of claim 1 further comprising the step of:
    defining a recording window.

8. The method of claim 7 wherein the recording of said still motion recorder and the recording of said full motion recorder is limited to steps performed in said recording window.

9. The method of claim 1 further comprising the step of:
    defining a recordable application wherein the recording of said still motion recorder and the recording of said full motion recorder is limited to steps performed within said application.

10. A system for creating an electronic movie of a series of operations performed within a computer environment, comprising
    means for recording still operations;
    means for recording full motion operations;
    means for automatically examining said series of operations to detect detail criteria in the series of operations indicating which are full motion operations, wherein said detail criteria comprises activity occurring over time to be captured in said series of operations;
    means for pausing said still operations recording means and initiating said full motion operations recording means upon detection of said detail criteria; and
    means for pausing said full motion operations recording means and re-initiating said still operation recording means.

11. The system of claim 10 further comprising:
    means for integrating said still operations and full motion operations into a continuous display format.

12. The system of claim 10 further comprising a means to edit said recorded still operations and said recorded full motion operations.

13. The system of claim 12 further comprising a means for editing said plurality of frames.

14. The system of claim 10 further comprising a means for displaying said integrated format as a plurality of frames.

15. The system of claim 14 wherein said means for editing comprises a means for inserting text and a means for inserting audio into said frames.

16. A method of creating an electronic training demonstration comprising a plurality of steps performed within a computer program, said method comprising:
    activating logic for determining which steps of said plurality of steps are still motions steps and which steps of said plurality of steps are full motion steps, wherein steps comprising activity occurring over time to be recorded are automatically determined to be full motion steps;
    recording said still motion steps with a still motion recorder to produce still motion files; and
    recording said full motion steps with a full motion recorder to produce full motion files.

17. The method of claim 16 further comprising:
    incorporating said still motion files and said full motion files into a movie file.

18. The method of claim 16 further comprising:
    displaying said still motion files and said full motion files as a plurality of frames, wherein a user can edit said frames before said full motion and still motion files are incorporated into said movie file.

19. The method of claim 18 further comprising:
displaying at least one of said still motion files with at least one of said plurality of frames, wherein said one frame is represented in a first manner; and
displaying at least one of said full motion files with at least another one of said plurality of frames, wherein said another frame is represented in a second manner.

20. The method of claim 16 further comprising:
activating logic for providing users with a first indicator to indicate that said still motion recorder is recording a still motion step and a second indicator to indicate that said full motion recorder is recording a full motion step.

21. The method of claim 20 wherein said first indicator and said second indicator comprised one or more of:
a visual indicator;
an audible indicator; and
a combination of said visual and said audible indicator.

22. A computer program product having non-transitory computer readable medium with computer program logic recorded thereon for recording steps performed in a computer environment to produce an electronic demonstration movie, said computer program product comprising:
code for recording at least one screen shot corresponding to at least one of said steps using a still motion recorder;
code for monitoring the steps performed in the computer environment, wherein said monitoring comprises automatically examining said steps for detail criteria, wherein said detail criteria comprises activity occurring over time to be captured in said steps;
code, operating in response to discovering said detail criteria, for pausing said still motion recorder and initiating a video recorder to record full motion of a detailed process comprised of a plurality of said steps; and
code, operating in response to an end of said detail criteria, for pausing said video recorder and re-instating said still motion recorder in response to said pausing.

23. The computer program product of claim 22 further comprising:
code for compiling said at least one screen shot and said recorded full motion into an electronic demonstration movie.

24. The computer program product of claim 22 wherein said detail criteria includes demonstrator-selection.

25. The computer program product of claim 22 wherein said detail criteria comprises a presence of a visual motion file in an active frame.

26. The computer program product of claim 22 further comprising:
code for executing logic to examine said steps for said detail criteria.

\* \* \* \* \*